US008019713B2

(12) United States Patent
Gupta et al.

(10) Patent No.: US 8,019,713 B2
(45) Date of Patent: Sep. 13, 2011

(54) COMMONSENSE REASONING ABOUT TASK INSTRUCTIONS

(75) Inventors: Rakesh Gupta, Mountain View, CA (US); Ken Hennacy, Columbia, MD (US)

(73) Assignee: Honda Motor Co., Ltd., Tokyo (JP)

( * ) Notice: Subject to any disclaimer, the term of this patent is extended or adjusted under 35 U.S.C. 154(b) by 246 days.

(21) Appl. No.: 11/378,063

(22) Filed: Mar. 16, 2006

(65) Prior Publication Data

US 2007/0022078 A1   Jan. 25, 2007

Related U.S. Application Data

(60) Provisional application No. 60/697,647, filed on Jul. 8, 2005.

(51) Int. Cl.
*G06N 5/02* (2006.01)
(52) U.S. Cl. ............................................. 706/48; 706/12
(58) Field of Classification Search .............. 706/47–48, 706/12
See application file for complete search history.

(56) References Cited

U.S. PATENT DOCUMENTS

| | | | |
|---|---|---|---|
| 4,638,445 A | 1/1987 | Mattaboni | |
| 4,884,217 A | 11/1989 | Skeirik et al. | |
| 5,392,382 A | 2/1995 | Schoppers | |
| 5,717,598 A | 2/1998 | Miyakawa et al. | |
| 5,774,632 A | 6/1998 | Kaske | |
| 5,889,926 A | 3/1999 | Bourne et al. | |
| 6,135,396 A | 10/2000 | Whitfield et al. | |
| 6,247,008 B1 | 6/2001 | Cambot et al. | |
| 6,353,814 B1 | 3/2002 | Weng | |
| 6,493,607 B1 | 12/2002 | Bourne et al. | |
| 6,581,048 B1 | 6/2003 | Werbos | |
| 6,604,094 B1 | 8/2003 | Harris | |
| 6,687,685 B1 | 2/2004 | Sadeghi et al. | |
| 6,862,497 B2 | 3/2005 | Kemp et al. | |
| 2002/0129015 A1 | 9/2002 | Caudill et al. | |
| 2003/0093514 A1 | 5/2003 | Valdes et al. | |
| 2004/0111408 A1 | 6/2004 | Caudill et al. | |
| 2005/0278362 A1 | 12/2005 | Maren et al. | |
| 2006/0004683 A1 | 1/2006 | Talbot et al. | |

FOREIGN PATENT DOCUMENTS

JP   09-245015   9/1997

(Continued)

OTHER PUBLICATIONS

Rakesh Gupta, Mykel Kochenderfer "Common Sense Data Acquisition for Indoor Mobile Robots" AAAI 2004.*

(Continued)

*Primary Examiner* — Jeffrey A Gaffin
*Assistant Examiner* — Lut Wong
(74) *Attorney, Agent, or Firm* — Fenwick & West LLP; Mark E. Duell

(57) ABSTRACT

A system and method enable an autonomous machine such as an indoor humanoid robot to systematically process user commands and respond to situations. The method captures distributed knowledge from human volunteers, referred to as "commonsense knowledge." The commonsense knowledge comprises classes such as steps for tasks, responses to situations, and locations and uses of objects. Filtering refines the commonsense knowledge into useful class rules. A second level of rules referred to as meta-rules performs reasoning by responding to user commands or observed situations, orchestrating the class rules and generating a sequence of task steps. A task sequencer processes the generated task steps and drives the mechanical systems of the autonomous machine.

29 Claims, 4 Drawing Sheets

FOREIGN PATENT DOCUMENTS

| JP | 10-149287 | 6/1998 |
|---|---|---|
| JP | 2001-157979 | 6/2001 |
| WO | WO 02/057961 A2 | 7/2002 |

OTHER PUBLICATIONS

Leonid Kalinichenko "Rule-based concept definitions intended for reconciliation of semantic conflicts in the interoperable information system" 1995.*

Weixiong Zhang "Representation of Assembly and Automatic Robot Planning by Petri Net" IEEE 1989.*

Weixiong Zhang ("representation of assembly and automatic robot planning by petri net" IEEE 1989).*

William Raynor ("The internation dictionary of Artificial Intelligence" 1999) cover and p. 186 only.*

Golovina Elena ("An Approach to Designing Intelligent Decision-Making Support System on the Basis of the Logic-Semiotic Apparatus" 2002).*

Tan et al ("representing exceptions in rule-based systems" 1990).*

Klein, D. et al. "Parsing with Treebank Grammars: Empirical Bounds, Theoretical Models, and the Structure of the Penn Treebank," Proceedings of the 39$^{th}$ Annual Meeting of the ACL, 2001, 8 pages.

PCT International Search Report and Written Opinion, PCT/US06/23554, Mar. 20, 2008, 8 pages.

PCT International Search Report and Written Opinion, PCT/US06/02204, Feb. 13, 2008, 7 pages.

PCT International Search Report and Written Opinion, PCT/US07/61061, Nov. 26, 2007, 8 pages.

PCT International Search Report and Written Opinion, PCT/US06/23822, Oct. 9, 2007, 9 pages.

Eagle, N., et al., "Context Sensing using Speech and Common Sense," May 2004.

Fei, T., et al., Question Classification for E-learning by Artificial Neural Network, IEEE, 2003, p. 1757-1761.

Lui, H., et al., "ConceptNet—a practical commonsense reasoning tool-kit," BT Technology Journal, Oct. 2004, p. 211-226, vol. 22, No. 4.

Lui, H., et al., "OMCSNet: A Commonsense Inference Toolkit," 2003.

Pratt, L., "Non-literal Transfer Among Neural Network Learners," Jan. 7, 1993, p. 1-25.

Singh, P., et al., "LifeNet: A Propositional Model of Ordinary Human Activity," 2003.

Waibel, A., et al., "Modularity and Scaling in large Phonemic Neural Networks," IEEE Transactions on Acoustics, Speech, and Signal Processing, Dec. 1989, p. 1888-1898, vol. 37, No. 12.

Stork, D. G. The OpenMind Initiative, IEEE Expert Systems and Their Applications 14(3):19-20, 1999, 2 pages.

Stork, D. G., "Open Data Collection for Training Intelligent Software in the Open Mind Initiative," Proceedings fo the Engineering Intelligent Systems (EIS2000), 1999, 7 pages.

Inamura, T., PEXIS: Probabilistic Experience Representation Based Adaptive Interaction System for Personal Robots, IEICE Transactions, The Institute of Electronics, Information and Communication Engineers, Jun. 1, 2001, vol. J84-D-1, No. 6, pp. 867-877.

Japanese Office Action, Japanese Patent Application No. 2008-520252, Jul. 6, 2009, 9 pages.

Japanese Office Action, Japanese Patent Application No. 2008-520252, Oct. 13, 2009, 14 pages.

Japanese Office Action, Japanese Patent Application No. 2008-520252, Feb. 2, 2010, 17 pages.

Japanese Office Action, Japanese Patent Application No. 2008-553450, Feb. 17, 2010, 7 pages.

Japanese Office Action, Japanese Patent Application No. 2008-553450, May 21, 2010, 8 pages.

Arroyo, A.A., "A Prototype Natural Language Processing System for Small Autonomous Agents," Machine Intelligence Laboratory, Department of Electrical and Computer Engineering, University of Florida, pp. 1-6.

Baumgartner, P. et al., "Automated Reasoning Support for SUMO/KIF," Max-Planck-Institute for Computer Science, Saarbrucken, Germany, Feb. 4, 2005, pp. 1-18.

Brill, Eric A Simple-Rule Based Part-of-Speech Tagger, Proceedings of ANLP-92, 34d Conference on Applied Natural Language Processing, Trento, IT, 1992, pp. 1-4.

Gupta, Rakesh et al., "Common Sense Data Acquisition for Indoor Mobile Robots," Nineteenth National Conference on Artificial Intelligence (AAAI-04), Jul. 25-29, 2004, pp. 1-6.

Kalinichenko, L.A., "Rule-Based Concept Definitions Intended for Reconciliation of Semantic Conflicts in the Interoperable Information Systems," Institute for Problems of Informatics, Proceedings of the Second International Baltic Workshop on DB and IS, Jun. 1996, pp. 1-12.

Kurfess, F.J., "CPE/CSC 481: Knowledge-Based Systems," 2005-6, Retrieved from the Internet<URL:www.csc.calpoly.edu/~fkurfess/Courses/481/Slides/>.

Laskey, K.B., "Knowledge Representation and Inference for Multisource Fusion," Apr. 2002, Retrieved from the Internet<URL:www.msri.org/publications/ln/hosted/nas/2002/laskey/1/banner/01.html>.

"Markov Chain," Willpedia, the free encyclopedia, [online] [Retrieved on Mar. 30, 2008] Retrieved from the Internet<URL: http://en.wikipedia.org/wiki/Markov_chain>.

Matsuda, Y. et al., "Synthesis of Multiple Answer Evaluation Measures Using a Machine Learning Technique for a QA System," Proceedings of the NTCIR-5 Workshop Meeting, Dec. 6-9, 2005, 7 pages.

"Mixed-Initiative Activity Planning," NASA Ames Research Center, 2004, [online] [Retrieved on Nov. 21, 2006] Retrieved from the Internet<URL:http://ic.arc.nasa.gov/publications/pdf/Mixed_Initiative_Act.pdf>.

Russell, S. J., et al., Artificial Intelligence—A Modern Approach, Second Edition, Prentice Hall, Pearson Education, Inc., New Jersey 2003/1995, pp. 462-538.

Setiono, R. et al., "Automatic Knowledge Extraction from Survey Data: Learning $M$-of-$N$ Constructs Using a Hybrid Approach," Journal of the Operational Research Society, 2005, pp. 3-14, vol. 56.

Soricut, R. et al., "Automatic Question Answering: Beyond the Factoid," [online] [Retrieved on Nov. 28, 2006] Retrieved from the Internet<URL:http://acl.idc.upenn.edu/hlt-naacl2004/main/pdf/104_Paper.pdf>.

Stork, David G., "Open Mind Initiative," ICDAR99, Bangalore, India, pp. 1-28.

* cited by examiner

COMMONSENSE REASONING ABOUT TASK INSTRUCTIONS

CROSS REFERENCE TO RELATED APPLICATIONS

This application claims the benefit under 35 USC §119(e) of U.S. Provisional Patent Application No. 60/697,647, titled "Commonsense Reasoning about Task Instructions," filed Jul. 8, 2005, which is incorporated by reference herein in its entirety.

This application is related to U.S. patent application Ser. No. 11/296,020, filed on Dec. 6, 2005, entitled "Building Plans for Household Tasks from Distributed Knowledge," which is incorporated by reference herein in its entirety.

This application is related to U.S. patent application Ser. No. 11/046,343, entitled "Responding to Situations Using Knowledge Representation and Inference," filed Jan. 28, 2005, which is incorporated by reference herein in its entirety.

FIELD OF THE INVENTION

The present invention generally relates to the field of autonomous machines, and more specifically, to enabling mobile robots to perform tasks in constrained environments.

BACKGROUND OF THE INVENTION

Humanoid robots, for example, robots having human characteristics, represent a major step in applying autonomous machine technology toward assisting persons in the home or office. Potential applications encompass a myriad of daily activities, such as attending infants and responding to queries and calls for assistance. Indoor humanoid robots may be expected to perform common household chores, such as making coffee, washing clothes, and cleaning a spill. Additional applications may include assisting elderly and handicapped persons. Humanoid robots will be expected to perform such tasks so as to satisfy the perceived desires and requests of their users. Through visual and voice recognition techniques, robots may be able to recognize and greet their users by name. In addition, robots should be able to learn through human interaction and other methods. In order to meet these needs, such robots should possess the requisite knowledge and reasoning ability.

In particular, to accomplish an indoor task, an autonomous system such as a humanoid robot should have a plan. It is desirable that such plans be fundamentally based on "common sense" knowledge. For example, steps for executing common household or office tasks can be collected from non-expert human volunteers using distributed capture techniques. However, it is also desirable that the robot be able to derive or update such a plan dynamically, taking into consideration aspects of the actual indoor environment where the task is to be performed. For example, the robot should be aware of the locations of objects involved in the plan. Furthermore, the robot should know how to respond to situations that arise before or during execution of the plan, such as a baby crying. Also, the robot should have awareness of the consequences of actions, such as the sink filling when the tap is on. In other words, the robot should be able to augment rules about performing tasks with knowledge of the actual environment, and with reasoning skills to adapt the rules to the environment in an appropriate manner. This integrated ability is referred to as commonsense reasoning.

Considerations for choosing a reasoning paradigm include the knowledge acquisition method, knowledge representation and scalability. Conventional approaches based upon knowledge and rules have been tailored to the specific knowledge used. Such representations are difficult to build and maintain. As the knowledge set is revised, iterative rule refinement is necessary to avoid interference among generated inferences. This may involve detailed design work that consumes increasing time and effort as the knowledge base grows.

Developments in reasoning in conjunction with knowledge bases have taken form in a number of conventional languages and systems. For example, pattern-recognition algorithms have been instantiated to search for facts, and traditional logic programming languages such as Prolog have utilized backward chaining. A description of this can be found in A. Colmerauer, *An Introduction to Prolog III*, Communications of the ACM 33(7):69-90, 1990, which is incorporated by reference herein in its entirety. Other reasoning systems based upon C Language Integrated Production System (CLIPS) have favored forward chaining. A description of this can be found in J. Giarratono and G. Riley, *Expert Systems Principles and Programming*, Third Edition, PWS Publishing Company, Boston, Mass., 1998, which is incorporated by reference herein in its entirety.

Use of a situational calculus within GOLOG or a fluent calculus within FLUX facilitate planning in dynamic environments. Descriptions of these concepts can be respectively found in H. Levesque, et al., Golog: *A Logic Programming Language for Dynamic Domains*, Journal of Logic Programming 31:59-84 1997, and in M. Thielscher, *Programming of Reasoning and Planning Agents with Flux*, Proc. of the 8th Int. Conf. on Principles of Knowledge Representation and Reasoning (KR2002), 263-315, Morgan Kaufmann Publishers, 2002, both of which are incorporated by reference herein in their entirety.

Systems built upon semantic networks such as SNePS have provided powerful search techniques on semi-structured knowledge to support belief revision and natural language processing. A description of this can be found in S.C. Shapiro and W. J. Rapaport, *SNePS Considered as a Fully Intensional Propositional Semantic Network*, Springer-Verlag, 263-315, New York, 1987, which is incorporated by reference herein in its entirety. Finally, approaches such as memory chunking in SOAR have provided methods to implement reflective introspection. A description of this can be found in P. S. Rosenbloom and J. E. Laird, Integrating Execution, Planning, And Learning in SOAR for External Environments, *Proceedings of the Eighth National Conference on Artificial Intelligence*, 1022-1029, MIT Press, Boston, Mass., 1990, which is incorporated by reference herein in its entirety.

For commonsense reasoning, a variety of knowledge sources and representations have been proposed for implementation. For example, knowledge bases such as CYC have been manually developed. A corresponding rule base utilizes heuristics and is also manually designed. A description of this can be found in R. V. Guha et al., *CYC: A Midterm Report*, Communications of the ACM 33(8): 391-407, 1990, which is incorporated by reference herein in its entirety. The OpenMind projects capture information provided by the public in natural-language form. Such knowledge capture is desirable for systems that interact with humans on a daily basis, but has proven difficult to use with logic-based reasoning. A description of this can be found in D. G. Stork, *The OpenMind Initiative*, IEEE Expert Systems and Their Applications 14(3):19-20, 1999, and in D. G. Stork, *Open Data Collection for Training Intelligent Software in the Open Mind Initiative*, Proceedings of the Engineering Intelligent Systems (EIS2000), 1999, both of which are incorporated by reference herein in their entirety.

From the above, there is a need for a practical method and system to enable an autonomous machine to perform indoor tasks and interact with humans through the integration of knowledge, rules and reasoning.

SUMMARY OF THE INVENTION

A system and method are provided for enabling an autonomous machine such as a humanoid robot to systematically process user commands and respond to situations. The method captures distributed knowledge from human volunteers, e.g., via the worldwide web, in response to prompts. Such knowledge can include steps for tasks like making coffee or washing clothes, responses to situations such as a baby crying, locations & uses of objects and causes & effects, and is referred to as "commonsense knowledge."

Knowledge extraction filtering processes the commonsense knowledge by searching for specific relationships and extracting "clean," e.g., useful, information. This produces categories, or classes of refined rules, referred to as class rules.

A second level of rules, referred to as meta-class rules, or meta-rules, responds to user commands or observed situations. Meta-rules may orchestrate and extract information from one or more categories of class rules. This process is referred to as meta-rule reasoning. Meta-rules may be hand-crafted, and are substantially independent of specific classes of knowledge. Meta-rules ensure that an autonomous machine such as a humanoid robot properly carries out a task. Once produced or formulated, class rules and meta-rules can be stored online, e.g., within the autonomous machine, for real-time application.

Meta-rules and meta-rule reasoning may be implemented using structured query language (SQL). SQL provides for an efficient search methodology based on natural language. Meta-rule reasoning generates natural language statements that in turn trigger additional meta-rules. In other words, the system talks to itself as it reasons. This allows consistent processing whether the language originates from a user or within the system. Meta-rules and class rules may also be used for other purposes, such as modeling interactions with humans, managing multiple actions and interactions, and handling anomalous situations that may arise during execution of tasks.

Once the overall task steps have been determined through meta-rule and class rule reasoning, a task sequencer processes the task steps and relevant facts perceived within the environment, and drives the mechanical systems of the autonomous machine.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Reference will now be made in detail to several embodiments of the present invention, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
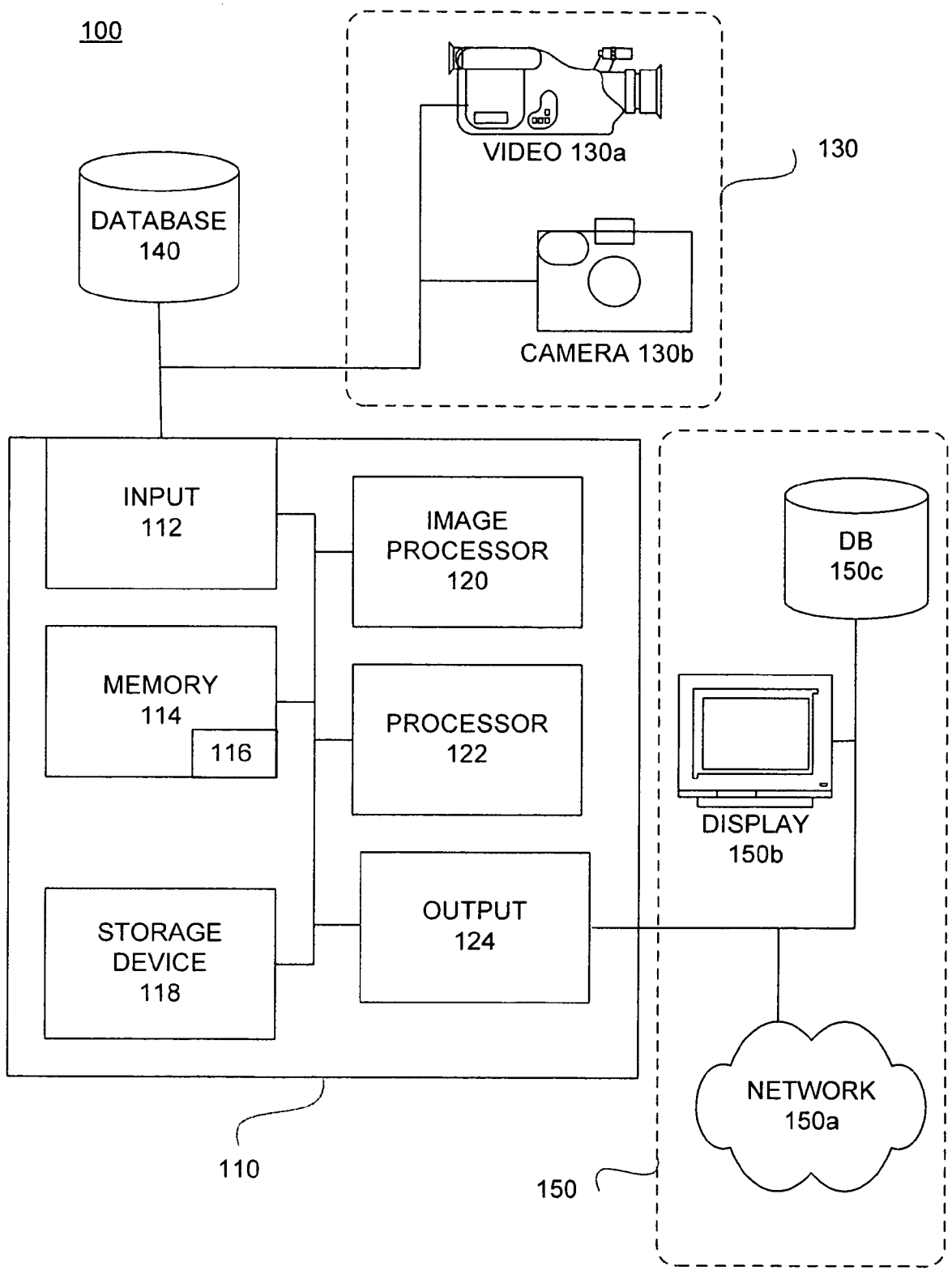
FIG. 1 illustrates a system according to one embodiment of the present invention.

FIG. 1 shows a system 100 according to one embodiment of the present invention. Computer system 110 comprises an input module 112, a memory device 114, a storage device 118, a processor 122, and an output module 124. In an alternative embodiment, an image processor 120 can be part of the main processor 122 or a dedicated device to perceive situations as digital images captured in a preferred image format. Similarly, memory device 114 may be a standalone memory device, (e.g., a random access memory (RAM) chip, flash memory, or the like), or a memory on-chip with processor 122 (e.g., cache memory). Storage device 118 may be any bulk storage device such as a hard disk, DVD-R/RW, CD-R/RW or RAM. Likewise, computer system 110 can be a stand-alone system, such as, a server, a personal computer, or the like. Alternatively, computer system 110 can be part of a larger system such as, for example, a robot having a vision system.

According to this embodiment, input module 112 receives information such as knowledge contributed by human volunteers from a database 140. Input module 112 may also receive digital images directly from an imaging device 130, for example, a digital camera 130a (e.g., robotic eyes), a video system 130b (e.g., closed circuit television), an image scanner, or the like. Alternatively, input module 112 may be an interface to receive information from a network system, for example, another database, another vision system, Internet servers, or the like. The network interface may be a wired interface, such as, a USB, RS-232 serial port, Ethernet card, or the like, or may be a wireless interface module, such as, a wireless device configured to communicate using a wireless protocol, e.g., Bluetooth, WiFi, IEEE 802.11, or the like. Image processor 120 could be used to pre-process the digital images received through the input module 112 to convert the digital images to the preferred format on which the processor 122 operates.

Information is stored in the memory device 114 to be processed by processor 122. Processor 122 applies a set of instructions that when executed perform one or more of the methods according to the present invention, e.g., generating a plan for executing a command. Memory device 114 may, for example, include a module of instructions 116 for generating such a plan.

Processor 122 may output information through the output module 124 to an external device 150, e.g., a network element or server 150a, a display device 150b, a database 150c or the like. As with input module 112, output module 124 can be wired or wireless. Output module 124 may be a storage drive interface, (e.g., hard-drive or optical drive driver), a network interface device (e.g., an Ethernet interface card, wireless network card, or the like), or a display driver (e.g., a graphics card, or the like), or any other such device for outputting the information or responses determined. In addition, output module 124 may interface appropriately with the systems of the autonomous machine responsible for effecting mechanical functionality.

Figure 2:
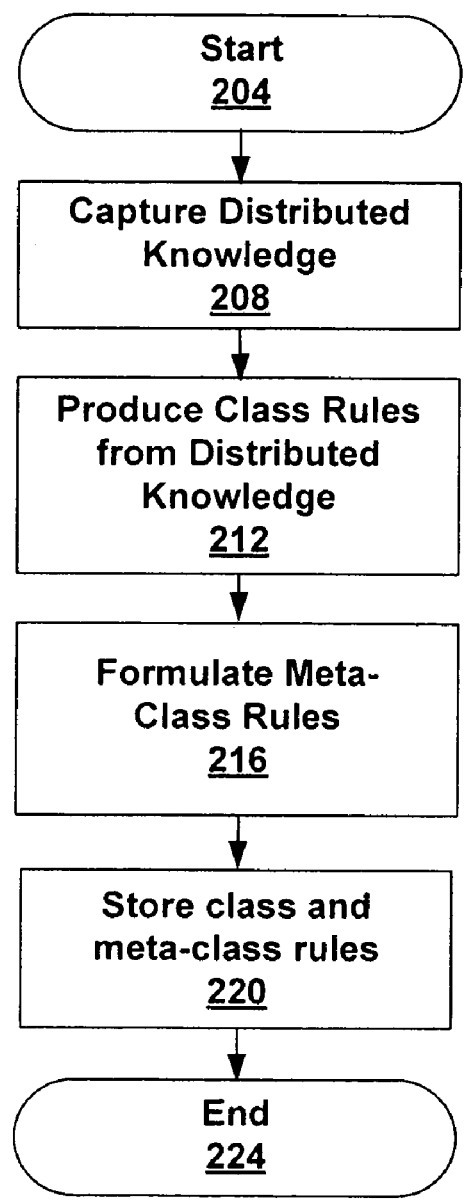
FIG. 2 illustrates a method of producing class and meta-class rules according to one embodiment of the present invention.

Referring now to FIG. 2, according to one embodiment of the present invention, a method 200 is shown for determining rules for developing a plan for a task or responding to a situation. Distributed knowledge is captured 208 from human volunteers using any of a variety of techniques. For example, the knowledge can be captured in natural language form over the Worldwide Web. Fill-in-the-blanks prompts may allow the volunteers to respond to questions regarding common household items, tasks and situations. The questions and captured knowledge may comprise several categories, or classes. One such class regards the steps for performing tasks. An example prompt might ask for the steps for making coffee. A volunteer might enter the following response in "raw text" form:

```
<Change the filter in the coffeemaker.>
<Add coffee grounds onto the filter.>
<Pour water into the top of the coffeemaker.>
<Turn on the coffeemaker switch.>
```

Another knowledge class regards responses to situations. For example, when queried what to do if a baby is crying, a volunteer might respond <feed baby> or <sing lullaby.> A third knowledge class regards the locations of objects in the indoor environment. For example, a volunteer might be prompted to enter the location where a dinner table is generally found. A fourth knowledge class regards the uses of objects. For example, a user might be prompted to describe the use of a hanger. Yet another knowledge class regards causes and effects. An example of volunteered knowledge according to this class would be the statement <When tap is on, then sink becomes full.>

It will be appreciated that additional classes of knowledge may be captured and stored in the knowledge database as well. According to one embodiment, the knowledge database comprises database 140, and the stored knowledge is referred to as "commonsense knowledge."

The commonsense knowledge is processed 212 to produce class rules. This effectively performs filtering and extraction by searching for specific relationships in the raw captured knowledge. "Clean," e.g., useful, information is then extracted to produce class rules. According to one embodiment, raw knowledge is accessed and processed using Structured Query Language (SQL) queries. For example, according to this embodiment, a Penn Treebank parser extracts class rules for task steps from volunteered task steps by performing a grammatical parse. For an action verb found in the knowledge database, the corresponding object is found and an action-object pair is formed. A description of this can be found in D. Klein and C. D. Manning, *Parsing with Treebank Grammars: Empirical Bounds, Theoretical Models, and the Structure of the Penn Treebank*, Proceedings of the 39th Annual Meeting of the ACL, 2001, which is incorporated by reference herein in its entirety.

For example, from the above raw-text sequence of steps for making coffee, the extracted class rule could be:

```
<change, filter>
<add, coffee grounds>
<pour, water>
<turn on, switch>
```

Additional description of deriving steps for tasks can be found in U.S. patent application "Building Plans for Household Tasks from Distributed Knowledge," which is referenced above.

A second category of class rules regards determining responses to situations. Information in the knowledge database is utilized to construct a multidimensional semantic network (MSN). The MSN provides a compact and efficient semantic representation suitable for further extraction of knowledge for inference purposes. The MSN also serves as the basis for task and response selection. When a particular situation is presented that warrants a response by the autonomous machine, a subset of the MSN is extracted into a Bayes network. The Bayes network is refined and used to derive a set of response probabilities, which can be utilized to formulate a specific response. Additional description of this can be found in U.S. patent application "Responding to Situations Using Knowledge Representation and Inference," which is referenced above.

Another category of class rules extracts cause-and-effect relationships from the knowledge database, such as the tap-on-sink-full relationship discussed above. Yet another category of class rules finds alternate action-object pairs that can substitute for an action-object pair that the autonomous machine does not know about. The cause-and-effect relationship between the unknown action and object can be used to find an alternate known action capable of achieving the same or a related effect. For example, if the unknown action object pair is (pour, water), for example, the autonomous machine does not know how to pour water, a match could be made to the known pair (tilt, water bottle). To make such a match, multiple cause-effect relationships can be chained together to determine, for example, alternate sources of water or the implicitly referenced container for pouring.

Another category of class rules determines likely uses and locations of objects. Since the source information in the knowledge database is contributed by multiple human volunteers, it cannot be specific to a particular environment, e.g., a particular home. However, such information may suggest, for example, that a couch may be located in any of multiple places such as the living room, family room, or den. Accordingly, this information is formulated statistically based on relative frequency of occurrence. For example, couches may be twice as likely to be located in living rooms than in family rooms. Optionally, WordNet from WinterTree Software can be utilized to produce another category of class rules that integrate information about synonyms of objects, e.g., TV and television. A description of this can be found in WordNet: An Electronic Lexical database, MIT Press, 1998, which is incorporated by reference herein in its entirety. Based on these class rules, upon arriving at a new home, a robot would have a "common sense" notion as to likely uses and locations of household objects. Over time, these class rules could be augmented or replaced by actual observations.

Another category of class rules performs synonym search and replacement, for example, to match unknown verbs to other verbs that the autonomous machine can interpret. For example, if a robot recognizes the word "replace," but not "change" or "alter," the use of lexical utilities such as WordNet facilitate binding "change" or "alter" within user statements to "replace."

Another category of class rules performs verb tense search and replacement. This class rule category might be used by a robot to provide verbal feedback to the user about the robot's current state and actions, as well as to target specific robotic functionality. For most verbs, the rule of adding "ed" or "ing" applies to convert to past or present participle tenses. However exceptions exist, such as the forms make and made. Such exceptions may be stored in a look-up table associated with the generic class rule. According to one embodiment, to convert verb references to present tense, applicable exceptions are checked, and then the rule is applied.

Persons skilled in the art will appreciate that the categories of class rules discussed above may not be exclusive, and that production and application of class rules is not limited to indoor environments. As will be discussed in more detail, the application of class rules to developing plans for executing tasks is referred to as class rule reasoning. Provision of class rules and class rule reasoning may be performed by system 110. In particular, processor 122 may perform class rule production and reasoning, and the class rules may be stored offline in a storage device such as device 118 or database 150c for real-time application.

Referring again to FIG. 2, meta-class rules (meta-rules) are next formulated 216. In addition to class rules that are specific to knowledge structures, rules are needed that are independent of specific classes, to seek missing details. Meta-rules orchestrate and extract requisite information from one or more categories of class rules. This process is referred to as meta-rule reasoning, and ensures that an autonomous machine such as a humanoid robot properly carries out a task. Meta-rules may be hand-crafted, and are substantially independent of specific classes of knowledge. In general, commonsense meta-rules are triggered to ensure that a robot (and environment) are properly configured to carry out a task by calling multiple class rules to extract missing pieces of information. Missing details are handled by meta-rules which work across knowledge categories and interact with the appropriate tables to extract the right information. Once produced or formulated, class rules and meta-rules can be stored in a storage device such as device 118 or database 150c for real-time application. Preferably, the number of meta-rules ranges from about ten to twenty.

Meta-rule reasoning should be efficient, since a robot's functionality should meet real-time constraints. SQL is well-suited to meet the needs of meta-rule implementation. SQL combines a rich variety of constraints and pattern-binding with logic, thereby providing the basis for an effective search methodology based on natural language.

Figure 3:
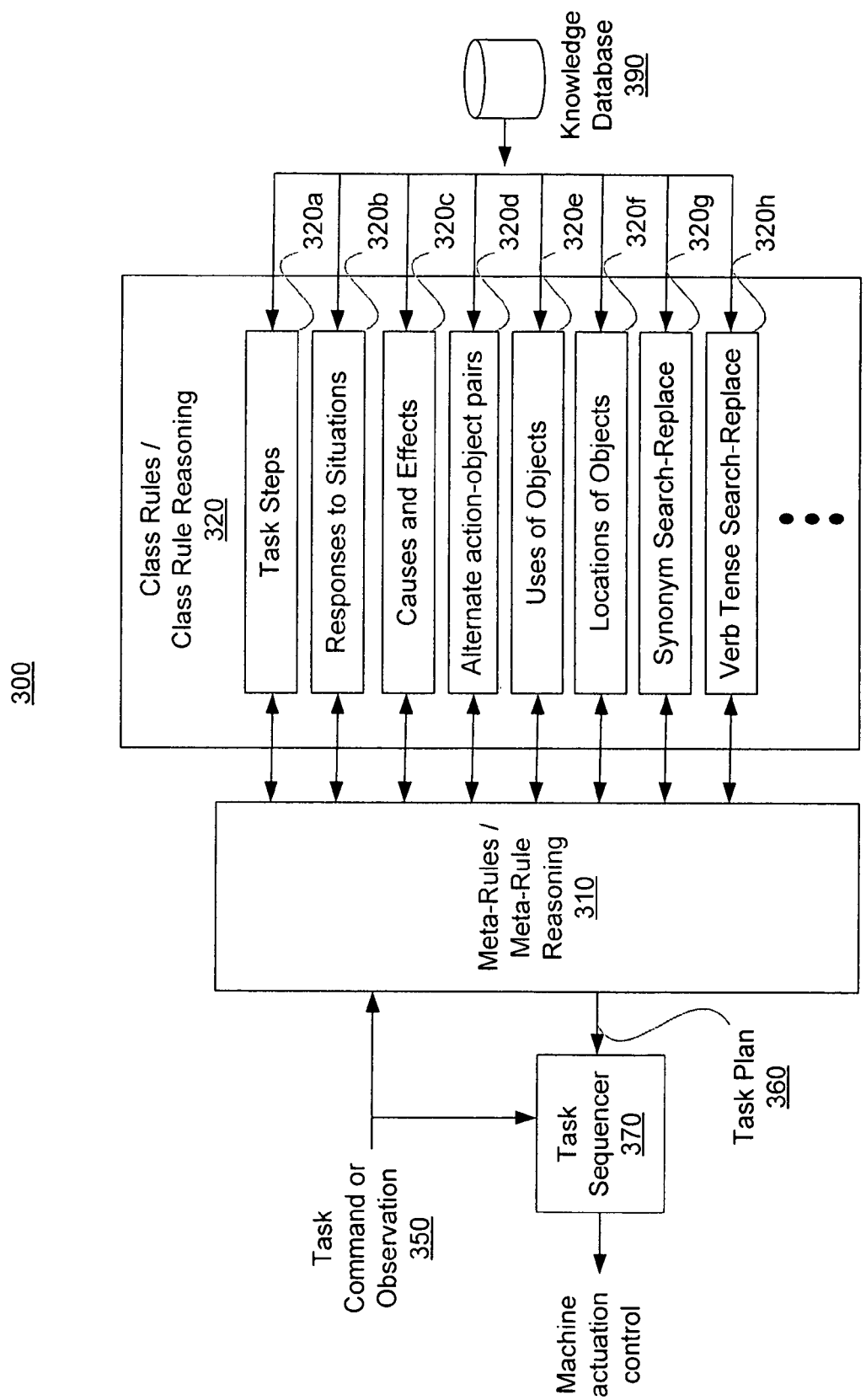
FIG. 3 illustrates application of class and meta-class rules according to one embodiment of the present invention.

FIG. 3 illustrates the interaction of meta-rule reasoning 310 and class rule reasoning 320 in developing a plan for executing a task. Meta-rules 310 respond to task commands or observed situations 350 and invoke or refer to class rules 320. Meta-rule reasoning 310 resolves a command or situation 350 into a context, e.g., a request, and a specific task reference, e.g., make coffee. Meta-rule reasoning 310 then looks up the pertinent task steps provided by class rule 320a and adapts them for use by a task sequencer 370. Task sequencer 370 processes the adapted task steps sequentially. As each step is processed, meta-rule reasoning 310 triggers a pair of queries to determine the locations the object comprising the task step and autonomous machine or robot. After a task step is executed, task sequencer 370 waits for a requisite fact within the environment to be recognized according to an observed situation 350. Task sequencer 370 then triggers execution of the next task step. Provision of meta-rules and meta-rule reasoning may be performed by system 110. As with class rules, processor 122 may perform meta-rule production and reasoning, and the meta-rules may be stored in storage device 118. Facts may be observed by vision system 130. In addition, task sequencer 370 may interface appropriately with the control and mechanical systems of the autonomous machine that are responsible for effecting the machine's physical functionality.

Figure 4:
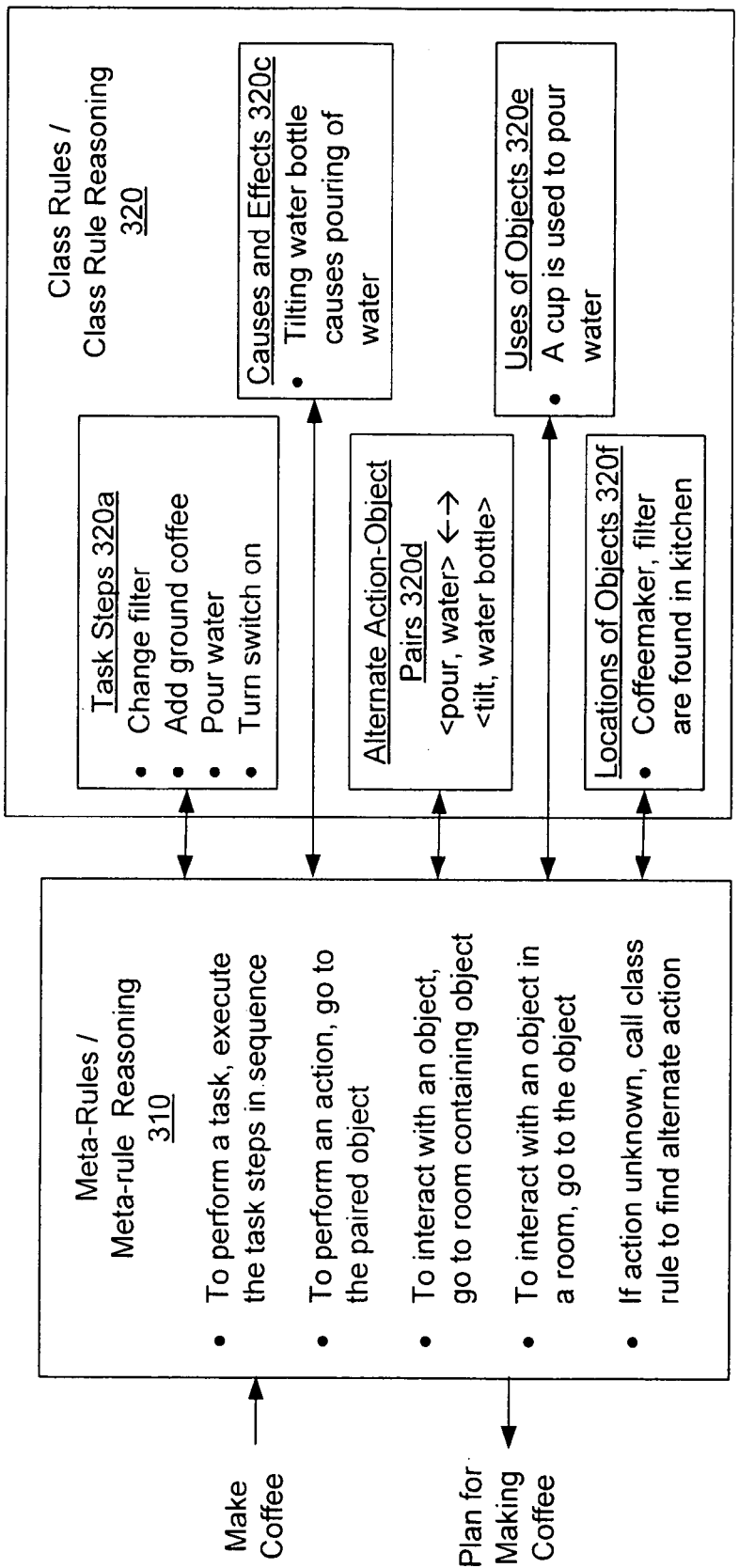
FIG. 4 illustrates application of class and meta-class rules according to an example task command.

Referring now to FIG. 4, these and other aspects of class- and meta-rule reasoning are next illustrated for the example of processing a user request to make coffee. After receiving the request, meta-rule reasoning 310 determines that corresponding task steps are needed, and calls the Task Steps class rule 320a. As discussed above, the first task step for making coffee provided by class rule 320a is <change, filter.> When this task step is received and processed by meta-rule reasoning 310, the tagged object <filter> is extracted and used to formulate a query. SQL is schema dependent. Therefore, when a knowledge base is queried in SQL, the field names and tables should be explicitly represented in the SQL syntax in order to obtain the answer. According to one embodiment, rather than formatting the query in SQL, meta-rule reasoning 310 utilizes a grammar rule to format the request in natural language, such as:

<Where is the filter?>

According to one embodiment, meta-rule reasoning 310 in conjunction with a language understanding process generates natural language statements processed by a natural language parser, which in turn triggers additional meta-rules. In other words, the system talks to itself as it reasons. Thereby, processing may be consistent whether the language originates from a user or within the system. Advantageously, rule representation is simplified, and the stored natural language is easily edited and augmented. Furthermore, the structure of the organized knowledge may be changed without modifying the associated rules.

The natural language statement generated by the meta-rule is parsed to determine the sentence structure. A template, for example, a look-up table, then translates the natural statement into a SQL statement that can access the data stored in the knowledge base. For example, in the case of a query involving the phrase <Where is . . . ?>, a template generates an SQL statement that can access the knowledge in the knowledge database, and can be processed to establish a new fact identifying the answer and expressed in natural language. Continuing the present example, the new fact would be expressed as:

<The filter is in the kitchen.>

This fact in turn automatically triggers the following natural-language query to determine the location of the robot:

<Where am I?>

These two newly-instantiated facts trigger a comparison rule to determine if the two objects (filter and robot) are in the same room. If not, meta-rule reasoning 310 triggers the following meta-rule, expressed in natural language:

> <To interact with an object, go to the room containing the object.>

This triggers another meta-rule that determines how the machine should navigate to the appropriate room from the current location. This is followed by a query to determine whether the robot has reached the intended destination. When the answer becomes "yes," another meta-rule is triggered to move the robot towards the object:

> <To interact with an object in a room, go to the object.>

Meta-rule reasoning 310 also orchestrates resolution of actions that the robot does not know how to execute by calling the alternate action object pairs class rule 320d. For example, an unknown step <pour, water,> can be processed further using reasoning concerning the interactions between objects and their states (cause-and-effect) to find an alternate way to achieve the same effect. Class rules match the effected object and property to entries in the knowledge base to find a possible cause, e.g. (tilt, water bottle). Alternative sources of water, or the implicitly referenced container for pouring can be determined by chaining together multiple cause and effects. This information is extracted using meta-rules and parsed into a look-up table for assembling a set of action-object pairs to accomplish the step. For example, the alternate action object pair class rule might return <tilt, water bottle.> Hence, missing details are handled by meta-rules to extract information.

After meta-rule reasoning is complete, the system may carry out the necessary actions using task sequencer 370 as described above.

Meta-rules 310 and class rules 320 may also be used for other purposes, such as modeling interactions with humans, managing interactions among multiple actions, and handling anomalous situations that may arise in the execution of the tasks. Although the example applications of the present invention described herein are applicable to home and office environments, method of the invention is applicable to other domains as well. Many of the class rules for other domains would be the same as those illustrated herein, but new distributed knowledge and class- and meta-rules could be added as appropriate. For example, new class and/or meta-rules could accommodate the needs of a medical nurse in a household environment.

Advantages of the present invention include a method and system for commonsense reasoning about task instructions. The method of the invention integrates knowledge, rules and reasoning according to multiple levels. The seamless integration of distributed knowledge, natural language processing, class rules and meta-rules simplifies rule and knowledge updates and makes the architecture and system scalable. The approach is sufficiently general for application to a number of operational environments.

Those of skill in the art will appreciate still additional alternative designs for a method and system for commonsense reasoning about task instructions. Thus, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

The invention claimed is:

1. A method for enabling an autonomous machine to perform a task in an environment, the method comprising:
   receiving data collected by a distributed capture technique, said data comprising at least one class of knowledge associated with the task;
   automatically processing said at least one class of knowledge associated with the task to produce one or more categories of class rules, wherein said processing comprises filtering and extracting the at least one class of knowledge, and wherein the class rules comprise specific relationships within the at least one class of knowledge; and
   formulating a set of meta-rules that extract information from two or more categories of class rules to orchestrate an application of said class rules within the environment, each meta-rule identifying information from two or more categories of class rules;
   responsive to a first category of class rules missing information associated with the task, applying a meta-rule to retrieve the missing information associated with the task from a second category of class rules.

2. The method of claim 1, further comprising storing said class rules and said meta-rules.

3. The method of claim 1, wherein the autonomous machine is a humanoid robot.

4. The method of claim 1, wherein the step of receiving data comprises receiving data from multiple persons or from multiple locations.

5. The method of claim 1, wherein said distributed capture technique comprises prompting a person to respond to a query, the query regarding said class of knowledge.

6. The method of claim 1, wherein said class of knowledge comprises at least one of: action-object pairs, task steps, responses to situations, causes and effects, alternate action-object pairs, uses of objects, likely uses of objects, locations of objects, likely locations of objects, synonym replacement, and verb tense replacement.

7. The method of claim 1, wherein the environment is an indoor environment.

8. The method of claim 1, wherein said meta-rules have a natural-language form.

9. The method of claim 1, further comprising:
   receiving at least one of a task command and a perceived situation within the environment;
   applying said meta-rules to orchestrate said application of said class rules in response to said task command or said perceived situation;
   applying said meta-rules to generate a set of task steps for performing the task; and
   sequencing said set of task steps to orchestrate an operation of the autonomous machine.

10. The method of claim 9, wherein said sequencing step comprises:
   receiving a first task step of said set of task steps, said first task step comprising an action and an object;
   determining said object of said first task step;
   determining a current location of said object;
   determining a current location of the autonomous machine;
   directing the autonomous machine to execute said first task step at said current location of said object;
   waiting for a fact related to said execution of said first task step to be recognized by the autonomous machine; and directing the autonomous machine to execute a subsequent task step of said set of task steps after said fact is recognized.

11. The method of claim 1, wherein extracting information from two or more categories of class rules comprises extracting information related to performing at least one task step.

12. An apparatus for an autonomous machine to perform a task in an environment, the apparatus comprising:
an input module receiving data collected by a distributed capture technique, said data comprising at least one class of knowledge associated with the task; and
a processor module coupled to the input module and to a memory device;
the memory device having computer program instructions embodied thereon to cause the processor module to implement a method for enabling the autonomous machine to perform the task in the environment, the method comprising the steps of:
automatically processing said at least one class of knowledge associated with the task to produce one or more categories of class rules, wherein said processing comprises filtering and extracting the at least one class of knowledge, and wherein the class rules comprise specific relationships within the at least one class of knowledge, and
formulating a set of meta-rules that extract information from two or more categories of class rules to orchestrate an application of said class rules within the environment, each meta-rule identifying information from two or more categories of class rules;
responsive to a first category of class rules missing information associated with the task, applying a meta-rule to retrieve the missing details information associated with the task from a second category of class rules.

13. The apparatus of claim 12, wherein the autonomous machine is a humanoid robot.

14. The apparatus of claim 12, wherein said class of knowledge comprises at least one of: action-object pairs, task steps, responses to situations, causes and effects, alternate action-object pairs, uses of objects, likely uses of objects, locations of objects, likely locations of objects, synonym replacement, and verb tense replacement.

15. The apparatus of claim 12, wherein:
said input module further receives at least one of a task command and a perceived situation within the environment; and
said processor module further:
applies said meta-rules to orchestrate said application of said class rules in response to said task command or said perceived situation,
applies said meta-rules to generate a set of task steps for performing the task, and
sequences said set of task steps to orchestrate an operation of the autonomous machine.

16. The apparatus of claim 15, wherein said sequencing step comprises:
receiving a first task step of said set of task steps, said first task step comprising an action and an object;
determining said object of said first task step;
determining a current location of said object;
determining a current location of the autonomous machine;
directing the autonomous machine to execute said first task step substantially at said current location of said object;
waiting for a fact related to said execution of said first task step to be recognized by the autonomous machine; and
directing the autonomous machine to execute a subsequent task step of said set of task steps after said fact is recognized.

17. The apparatus of claim 12, wherein extracting information from two or more categories of class rules comprises extracting information related to performing at least one task step.

18. An apparatus for an autonomous machine to perform a task in an environment, the apparatus comprising:
means to receive data collected by a distributed capture technique, said data comprising at least one class of knowledge associated with the task;
means to automatically process said at least one class of knowledge associated with the task to produce one or more categories of class rules, wherein said processing comprises filtering and extracting the at least one class of knowledge, and wherein the class rules comprise specific relationships within the at least one class of knowledge; and
means to formulate a set of meta-rules that extract information from two or more categories of class rules to orchestrate an application of said class rules within the environment, each meta-rule identifying information from two or more categories of class rules;
means to, responsive to a first category of class rules missing information associated with the task, apply a meta-rule to retrieve the missing information associated with the task from a second category of class rules.

19. The apparatus of claim 18, wherein the autonomous machine is a humanoid robot.

20. The apparatus of claim 18, wherein said class of knowledge comprises at least one of: action-object pairs, task steps, responses to situations, causes and effects, alternate action-object pairs, uses of objects, likely uses of objects, locations of objects, likely locations of objects, synonym replacement, and verb tense replacement.

21. The apparatus of claim 18, further comprising:
means to receive at least one of a task command and a perceived situation within the environment;
means to apply said meta-rules to orchestrate said application of said class rules in response to said task command or said perceived situation;
means to apply said meta-rules to generate a set of task steps for performing the task; and
means to sequence said set of task steps to orchestrate an operation of the autonomous machine.

22. The apparatus of claim 21, wherein said means for sequencing comprises:
means to receive a first task step of said set of task steps, said first task step comprising an action and an object;
means to determine said object of said first task step;
means to determine a current location of said object;
means to determine a current location of the autonomous machine;
means to direct the autonomous machine to execute said first task step at said current location of said object;
means to wait for a fact related to said execution of said first task step to be recognized by the autonomous machine; and
means to direct the autonomous machine to execute a subsequent task step of said set of task steps after said fact is recognized.

23. The apparatus of claim 18, wherein extracting information from two or more categories of class rules comprises extracting information related to performing at least one task step.

24. A computer program product, comprising a memory device having computer program instructions embodied thereon to cause a computer processor to implement a method for enabling an autonomous machine to perform a task in an environment, the method comprising:
- receiving data collected by a distributed capture technique, said data comprising at least one class of knowledge associated with the task;
- automatically processing said at least one class of knowledge associated with the task to produce one or more categories of class rules, wherein said processing comprises filtering and extracting the at least one class of knowledge, and wherein the class rules comprise specific relationships within the at least one class of knowledge; and
- formulating a set of meta-rules that extract information from two or more categories of class rules to orchestrate an application of said class rules within the environment, each meta-rule identifying information from two or more categories of class rules;
- responsive to a first category of class rules missing information associated with the task, applying a meta-rule to retrieve the missing information associated with the task from a second category of class rules.

25. The computer program product of claim 24, wherein the autonomous machine is a humanoid robot.

26. The computer program product of claim 24, wherein said class of knowledge comprises at least one of: action-object pairs, task steps, responses to situations, causes and effects, alternate action-object pairs, uses of objects, likely uses of objects, locations of objects, likely locations of objects, synonym replacement, and verb tense replacement.

27. The computer program product of claim 24, wherein said method further comprises the steps of:
- receiving at least one of a task command and a perceived situation within the environment;
- applying said meta-rules to orchestrate said application of said class rules in response to said task command or said perceived situation;
- applying said meta-rules to generate a set of task steps for performing the task; and
- sequencing said set of task steps to orchestrate an operation of the autonomous machine.

28. The computer program product of claim 27, wherein said sequencing step comprises:
- receiving a first task step of said set of task steps, said first task step comprising an action and an object;
- determining said object of said first task step;
- determining a current location of said object;
- determining a current location of the autonomous machine;
- directing the autonomous machine to execute said first task step at said current location of said object;
- waiting for a fact related to said execution of said first task step to be recognized by the autonomous machine; and
- directing the autonomous machine to execute a subsequent task step of said set of task steps after said fact is recognized.

29. The computer program product of claim 24, wherein extracting information from two or more categories of class rules comprises extracting information related to performing at least one task step.

* * * * *

UNITED STATES PATENT AND TRADEMARK OFFICE
CERTIFICATE OF CORRECTION

| | | |
|---|---|---|
| PATENT NO. | : 8,019,713 B2 | Page 1 of 1 |
| APPLICATION NO. | : 11/378063 | |
| DATED | : September 13, 2011 | |
| INVENTOR(S) | : Rakesh Gupta et al. | |

It is certified that error appears in the above-identified patent and that said Letters Patent is hereby corrected as shown below:

Column 11, line 33, after "missing" delete "details".

Signed and Sealed this
Eighth Day of November, 2011

David J. Kappos
*Director of the United States Patent and Trademark Office*